United States Patent
Dong

(10) Patent No.: US 11,792,518 B2
(45) Date of Patent: Oct. 17, 2023

(54) METHOD AND APPARATUS FOR PROCESSING IMAGE

(71) Applicant: SPREADTRUM COMMUNICATIONS (SHANGHAI) CO., LTD., Shanghai (CN)

(72) Inventor: Xiaoxia Dong, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 84 days.

(21) Appl. No.: 17/628,533

(22) PCT Filed: May 20, 2020

(86) PCT No.: PCT/CN2020/091292
§ 371 (c)(1),
(2) Date: Jan. 19, 2022

(87) PCT Pub. No.: WO2021/012766
PCT Pub. Date: Jan. 28, 2021

(65) Prior Publication Data
US 2022/0294989 A1      Sep. 15, 2022

(30) Foreign Application Priority Data
Jul. 19, 2019  (CN) .......................... 201910656105.5

(51) Int. Cl.
*H04N 23/69* (2023.01)
*H04N 23/54* (2023.01)
*H04N 23/67* (2023.01)

(52) U.S. Cl.
CPC ............. *H04N 23/69* (2023.01); *H04N 23/54* (2023.01); *H04N 23/67* (2023.01)

(58) Field of Classification Search
CPC ..................................................... H04N 23/69
(Continued)

(56) References Cited

U.S. PATENT DOCUMENTS

2005/0057662 A1* 3/2005 Washisu ............... H04N 23/687
348/208.99
2009/0295978 A1   12/2009 Yun
(Continued)

FOREIGN PATENT DOCUMENTS

CN           103971352 A       8/2014
CN           104104850 A      10/2014
(Continued)

OTHER PUBLICATIONS

First Office Action, The State Intellectual Property Office of People's Republic of China, Chinese Patent Application No. 201910656105.5, dated Nov. 9, 2020.
(Continued)

*Primary Examiner* — Joel W Fosselman
(74) *Attorney, Agent, or Firm* — CHRISTENSEN O'CONNOR JOHNSON KINDNESS PLLC

(57) ABSTRACT

The present disclosure relates to a method and apparatus for processing image. The method includes: determining a first translation amount based on a first voice coil motor (VCM) value of a first image photographed by a wide-angle camera, the VCM value is a normalized value corresponding to a magnitude of a current acting on a coil of a VCM in response to successful focusing of the camera; determining a second translation amount based on a zoom multiple of the first image and the first translation amount; and obtaining a target image by translating the first image by the second translation amount and amplifying the first image. According to the present disclosure, smooth switching of zooming can be achieved, and obvious geometric jump of images in continuous focal lengths and between focal lengths is avoided, thereby providing a good zooming experience to the user.

26 Claims, 4 Drawing Sheets

(58) Field of Classification Search
USPC .................................................. 348/240.99
See application file for complete search history.

(56) References Cited

U.S. PATENT DOCUMENTS

| | | |
|---|---|---|
| 2015/0350549 A1 | 12/2015 | Gregory et al. |
| 2018/0183982 A1 | 6/2018 | Lee et al. |
| 2018/0295292 A1* | 10/2018 | Lee ........................ H04N 23/67 |

FOREIGN PATENT DOCUMENTS

| | | |
|---|---|---|
| CN | 105787947 A | 7/2016 |
| CN | 106161941 A | 11/2016 |
| CN | 106385541 A | 2/2017 |
| CN | 106454132 A | 2/2017 |
| CN | 107483808 A | 12/2017 |
| CN | 107566707 A | 1/2018 |
| CN | 107846556 A | 3/2018 |
| CN | 108243299 A | 7/2018 |
| CN | 108377342 A | 8/2018 |
| JP | 2001281528 A | 10/2001 |

OTHER PUBLICATIONS

Notice of Grant, The State Intellectual Property Office of People's Republic of China, Chinese Patent Application No. 201910656105.5, dated Apr. 15, 2021.
International Search Report, PCT/CN2020/091292, dated Aug. 25, 2020, 5 pages.

* cited by examiner

METHOD AND APPARATUS FOR PROCESSING IMAGE

TECHNICAL FIELD

The present disclosure relates to the field of image processing technologies, and in particular, to a method and apparatus for processing image.

BACKGROUND

With the continuous development of technologies, cameras become increasingly important in a user equipment (for example, a mobile phone or a tablet). Traditionally, a single camera was used. Two, three, or more cameras are currently used in a user equipment, to achieve an effect similar to a single-lens reflex camera. A zoom function can be achieved for an early mobile phone with a single camera only through digital zoom, an image will become quite blurred when being enlarged to a certain multiple through digital zoom, and the image quality is less than satisfactory. If optical zoom is implemented by using a multi-fold optical camera, there will be inevitably an increase in costs as well as in thickness of the mobile phone.

To avoid excessive use of space by the camera, currently, mainstream mobile phones usually implement an optical zoom function within multi-focal lengths by using a wide-angle camera and a long-focus camera. The focal length is divided into a wide-angle length and a long-focus length, and a zoom range is enlarged through switching. When the focal length falls within the wide-angle length, a wide-angle camera is mainly used for capturing an image, and when the focal length falls within the long-focus length, a long-focus camera is mainly used for capturing an image. Due to a difference in hardware (for example, a focal length or a field of view) of the wide-angle camera and the long-focus camera, a mounting process and the like, when the wide-angle camera and the long-focus camera are photographing the same scene object, images obtained inevitably have geometric deviations, and when switching is performed between two focal lengths, obvious visual jump may occur.

SUMMARY

In view of this, one aspect of the present disclosure provides a method for processing image. The method includes: determining a first translation amount based on a first voice coil motor (VCM) value of a first image photographed by a wide-angle camera, the VCM value is a normalized value corresponding to a magnitude of a current acting on a coil of a VCM in response to successful focusing of the camera; determining a second translation amount based on a zoom multiple of the first image and the first translation amount; and obtaining a target image by translating the first image by the second translation amount and amplifying the first image.

In some embodiments, the method further includes: obtaining a calibrated VCM value and a first calibrated translation amount by performing calibration processing based on a preset calibration distance.

In some embodiments, based on that the first VCM value is between a first preset VCM value and the calibrated VCM value, and a distance corresponding to the first preset VCM value is greater than the preset calibration distance, said determining a first translation amount according to a first VCM value of a first image photographed by a wide-angle camera includes: determining the first translation amount based on the first VCM value and a first correspondence, the first correspondence is a correspondence of a translation amount between a wide-angle image and a long-focus image, and a VCM value of the wide-angle image photographed by the wide-angle camera, the wide-angle image is photographed by the wide-angle camera, and the long-focus image is photographed by a long-focus camera.

In some embodiments, the method further includes: obtaining a second calibrated translation amount based on the calibrated VCM value and the first correspondence; and obtaining a translation correction amount by using the first calibrated translation amount and the second calibrated translation amount.

In some embodiments, said determining a first translation amount based on a first VCM value of a first image photographed by a wide-angle camera further includes: obtaining corrected first translation amount by correcting the first translation amount by using the translation correction amount.

In some embodiments, the method further includes: determining the first correspondence through the following steps: obtaining a plurality of groups of wide-angle images and a plurality of groups of long-focus images by photographing target subjects at different distances by using a plurality of electronic devices, and recording a VCM value obtained when each of the plurality of electronic devices photographs a wide-angle image at each distance, each electronic device includes the wide-angle camera and the long-focus camera; determining a translation amount between a wide-angle image and a long-focus image that are photographed by each electronic device at each distance; obtaining a plurality of groups of initial correspondences by performing curve fitting on the translation amount and the VCM value that are obtained by each electronic device; and obtaining the first correspondence by averaging the plurality of groups of initial correspondences.

In some embodiments, based on that the first VCM value is between a second preset VCM value and a first preset VCM value, the second preset VCM value is less than the first preset VCM value, and a distance corresponding to the first preset VCM value is greater than the preset calibration distance, said determining a first translation amount based on a first VCM value of a first image photographed by a wide-angle camera includes: using a translation amount corresponding to the first preset VCM value as the first translation amount.

In some embodiments, based on that the first VCM value is less than the second preset VCM value, said determining a first translation amount based on a first VCM value of a first image photographed by a wide-angle camera includes: determining the first translation amount as 0.

In some embodiments, the method further includes: determining a VCM value corresponding to a first preset distance and a VCM value corresponding to a second preset distance based on the calibrated VCM value and a preset VCM current relationship, the first preset distance is less than the second preset distance, and the preset VCM current relationship is a correspondence between a preset distance and a VCM value; and respectively obtaining a translation amount corresponding to the first preset distance and a translation amount corresponding to the second preset distance by using the VCM value corresponding to the first preset distance and the VCM value corresponding to the second preset distance in the preset calibration distance, said determining a first translation amount based on a first VCM value of a first image photographed by a wide-angle camera includes: determining the first translation amount based on the first VCM value, the calibrated VCM value, the first calibrated translation amount, the VCM value corresponding to the first preset distance, the VCM value corresponding to the second preset distance, the translation amount corresponding to the first preset distance, and the translation amount corresponding to the second preset distance.

In some embodiments, said determining the first translation amount based on the first VCM value, the calibrated VCM value, the first calibrated translation amount, the VCM value corresponding to the first preset distance, and the VCM value corresponding to the second preset distance includes: determining that the first translation amount is the first calibrated translation amount based on that the first VCM value is greater than or equal to ½ of a sum of the calibrated VCM value and the VCM value corresponding to the first preset distance; or determining that the first translation amount is the translation amount corresponding to the first preset distance based on that the first VCM value is greater than or equal to ½ of a sum of the VCM value corresponding to the first preset distance and the VCM value corresponding to the second preset distance and less than ½ of a sum of the calibrated VCM value and the VCM value corresponding to the first preset distance; or determining that the first translation amount is the translation amount corresponding to the second preset distance based on that the first VCM value is greater than or equal to a second preset VCM value and less than ½ of a sum of the VCM value corresponding to the first preset distance and the VCM value corresponding to the second preset distance, the second preset VCM value is less than a first preset VCM value, and a distance corresponding to the first preset VCM value is greater than the preset calibration distance; or determining the first translation amount as 0 based on that the first VCM value is less than the second preset VCM value.

In some embodiments, said determining a first translation amount based on a first VCM value of a first image photographed by a wide-angle camera includes: determining the first translation amount based on the first VCM value, the calibrated VCM value, the first calibrated translation amount, and a second preset VCM value, the second preset VCM value is less than a first preset VCM value, and a distance corresponding to the first preset VCM value is greater than the preset calibration distance.

In some embodiments, said determining the first translation amount based on the first VCM value, the calibrated VCM value, the first calibrated translation amount, and a second preset VCM value includes: determining that the first translation amount is the first calibrated translation amount based on that the first VCM value is greater than or equal to ½ of a sum of the calibrated VCM value and the second preset VCM value; or determining that the first translation amount is ½ of the first calibrated translation amount based on that the first VCM value is greater than or equal to the second preset VCM value and less than ½ of a sum of the calibrated VCM value and the second preset VCM value; or determining the first translation amount as 0 based on that the first VCM value is less than the second preset VCM value.

In some embodiments, said determining a second translation amount based on a zoom multiple of the first image and the first translation amount includes: determining the second translation amount based on the following formula:

$$S' = \frac{S}{z_0 - 1} * z - \frac{S}{z_{0-1}},$$

where z represents the zoom multiple of the first image, S' represents the second translation amount, $z_0$ represents a preset zoom multiple, and S represents the first translation amount.

According to another aspect of the present disclosure, an apparatus for processing image is provided, including: a first determining module, configured to determine a first translation amount based on a first voice coil motor (VCM) value of a first image photographed by a wide-angle camera, the VCM value is a normalized value corresponding to a magnitude of a current acting on a coil of a VCM in response to successful focusing of the camera; a second determining module, connected to the first determining module, and configured to determine a second translation amount based on a zoom multiple of the first image and the first translation amount; and a processing module, connected to the second determining module, and configured to obtain a target image by translating the first image by the second translation amount and amplify the first image.

In some embodiments, the apparatus further includes: a calibration module, connected to the first determining module and configured to obtain a calibrated VCM value and a first calibrated translation amount by performing calibration processing based on a preset calibration distance.

In some embodiments, based on that the first VCM value is between a first preset VCM value and the calibrated VCM value, and a distance corresponding to the first preset VCM value is greater than the preset calibration distance, said determining a first translation amount according to a first VCM value of a first image photographed by a wide-angle camera includes: determining the first translation amount based on the first VCM value and a first correspondence, the first correspondence is a correspondence of a translation amount between a wide-angle image and a long-focus image, and a VCM value of the wide-angle image photographed by the wide-angle camera, the wide-angle image is photographed by the wide-angle camera, and the long-focus image is photographed by a long-focus camera.

In some embodiments, the apparatus further includes: a third determining module, configured to obtain a second calibrated translation amount according to the calibrated VCM value and the first correspondence; and further configured to obtain a translation correction amount by using the first calibrated translation amount and the second calibrated translation amount.

In some embodiments, said determining a first translation amount according to a first VCM value of a first image photographed by a wide-angle camera further includes: obtaining a corrected first translation amount by correcting the first translation amount by using the translation correction amount.

In some embodiments, the first correspondence is determined through the following steps: obtaining a plurality of groups of wide-angle images and a plurality of groups of long-focus images by photographing target subjects at different distances by using a plurality of electronic devices, and recording a VCM value obtained when each electronic device photographs a wide-angle image at each distance, where each electronic device includes the wide-angle camera and the long-focus camera; determining a translation amount between a wide-angle image and a long-focus image that are photographed by each electronic device at each distance; obtaining a plurality of groups of initial correspondences by performing curve fitting on the translation amount and the VCM value that are obtained by each electronic device; and obtaining the first correspondence by averaging the plurality of groups of initial correspondences.

In some embodiments, based on that the first VCM value is between a second preset VCM value and a first preset VCM value, the second preset VCM value is less than the first preset VCM value, and a distance corresponding to the first preset VCM value is greater than the preset calibration distance, said determining a first translation amount according to a first VCM value of a first image photographed by a wide-angle camera includes: using a translation amount corresponding to the first preset VCM value as the first translation amount.

In some embodiments, based on that the first VCM value is less than the second preset VCM value, the determining a first translation amount according to a first VCM value of a first image photographed by a wide-angle camera includes: determining the first translation amount as 0.

In some embodiments, the apparatus further includes: a fourth determining module, configured to determine a VCM value corresponding to a first preset distance and a VCM value corresponding to a second preset distance according to the calibrated VCM value and a preset VCM current relationship, where the first preset distance is less than the second preset distance, and the preset VCM current relationship is a correspondence between a preset distance and a VCM value; and further configure to respectively obtain a translation amount corresponding to the first preset distance and a translation amount corresponding to the second preset distance by using the VCM value corresponding to the first preset distance and the VCM value corresponding to the second preset distance in the preset calibration distance, where the determining a first translation amount according to a first VCM value of a first image photographed by a wide-angle camera includes: determining the first translation amount according to the first VCM value, the calibrated VCM value, the first calibrated translation amount, the VCM value corresponding to the first preset distance, the VCM value corresponding to the second preset distance, the translation amount corresponding to the first preset distance, and the translation amount corresponding to the second preset distance.

In some embodiments, the determining the first translation amount according to the first VCM value, the calibrated VCM value, the first calibrated translation amount, the VCM value corresponding to the first preset distance, and the VCM value corresponding to the second preset distance includes: determining that the first translation amount is the first calibrated translation amount in a case that the first VCM value is greater than or equal to ½ of a sum of the calibrated VCM value and the VCM value corresponding to the first preset distance; or determining that the first translation amount is the translation amount corresponding to the first preset distance in a case that the first VCM value is greater than or equal to ½ of a sum of the VCM value corresponding to the first preset distance and the VCM value corresponding to the second preset distance and less than ½ of a sum of the calibrated VCM value and the VCM value corresponding to the first preset distance; or determining that the first translation amount is the translation amount corresponding to the second preset distance in a case that the first VCM value is greater than or equal to a second preset VCM value and less than ½ of a sum of the VCM value corresponding to the first preset distance and the VCM value corresponding to the second preset distance, where the second preset VCM value is less than a first preset VCM value, and a distance corresponding to the first preset VCM value is greater than the preset calibration distance; or determining the first translation amount as 0 in a case that the first VCM value is less than the second preset VCM value.

In some embodiments, the determining a first translation amount according to a first VCM value of a first image photographed by a wide-angle camera includes: determining the first translation amount according to the first VCM value, the calibrated VCM value, the first calibrated translation amount, and a second preset VCM value, where the second preset VCM value is less than a first preset VCM value, and a distance corresponding to the first preset VCM value is greater than the preset calibration distance.

In some embodiments, the determining the first translation amount according to the first VCM value, the calibrated VCM value, the first calibrated translation amount, and a second preset VCM value includes: determining that the first translation amount is the first calibrated translation amount in a case that the first VCM value is greater than or equal to ½ of a sum of the calibrated VCM value and the second preset VCM value; or determining that the first translation amount is ½ of the first calibrated translation amount in a case that the first VCM value is greater than or equal to the second preset VCM value and less than ½ of a sum of the calibrated VCM value and the second preset VCM value; or determining the first translation amount as 0 in a case that the first VCM value is less than the second preset VCM value.

In some embodiments, the determining a second translation amount according to a zoom multiple of the first image and the first translation amount includes: determining the second translation amount according to the following formula:

$$S' = \frac{S}{z_0 - 1} * z - \frac{S}{z_0 - 1},$$

where z represents the zoom multiple of the first image, S' represents the second translation amount, $z_0$ represents a preset zoom multiple, and S represents the first translation amount.

According to still another aspect of the present disclosure, an apparatus for processing image is provided, including: a processor; and a memory configured to store instructions executable by the processor. The processor is configured to perform any of the methods as described above.

According to yet another aspect of the present disclosure, a non-transitory computer-readable storage medium is provided, storing computer program instructions, when the computer program instructions are executed by a processor, any of the methods described above is implemented.

In the present disclosure, a first translation amount is determined according to a first VCM value of a first image photographed by a wide-angle camera, a second translation amount is determined according to a zoom multiple of the first image and the first translation amount, and the first image is translated by the second translation amount and then the first image is amplified to obtain a target image, smooth switching of zooming can be achieved, and obvious geometric jump of images within continuous focal lengths and between focal lengths is avoided, thereby providing a good zooming experience to the user.

According to the following detailed descriptions of exemplary embodiments with reference to the accompanying drawings, other features and aspects of the present disclosure will become clear.

BRIEF DESCRIPTION OF THE DRAWINGS

The accompanying drawings included in the specification and constituting a part of the specification, together with the specification, illustrate exemplary embodiments, features, and aspects of the present disclosure, and are used to explain the principle of the present disclosure.

DESCRIPTION OF EMBODIMENTS

Figure 1:
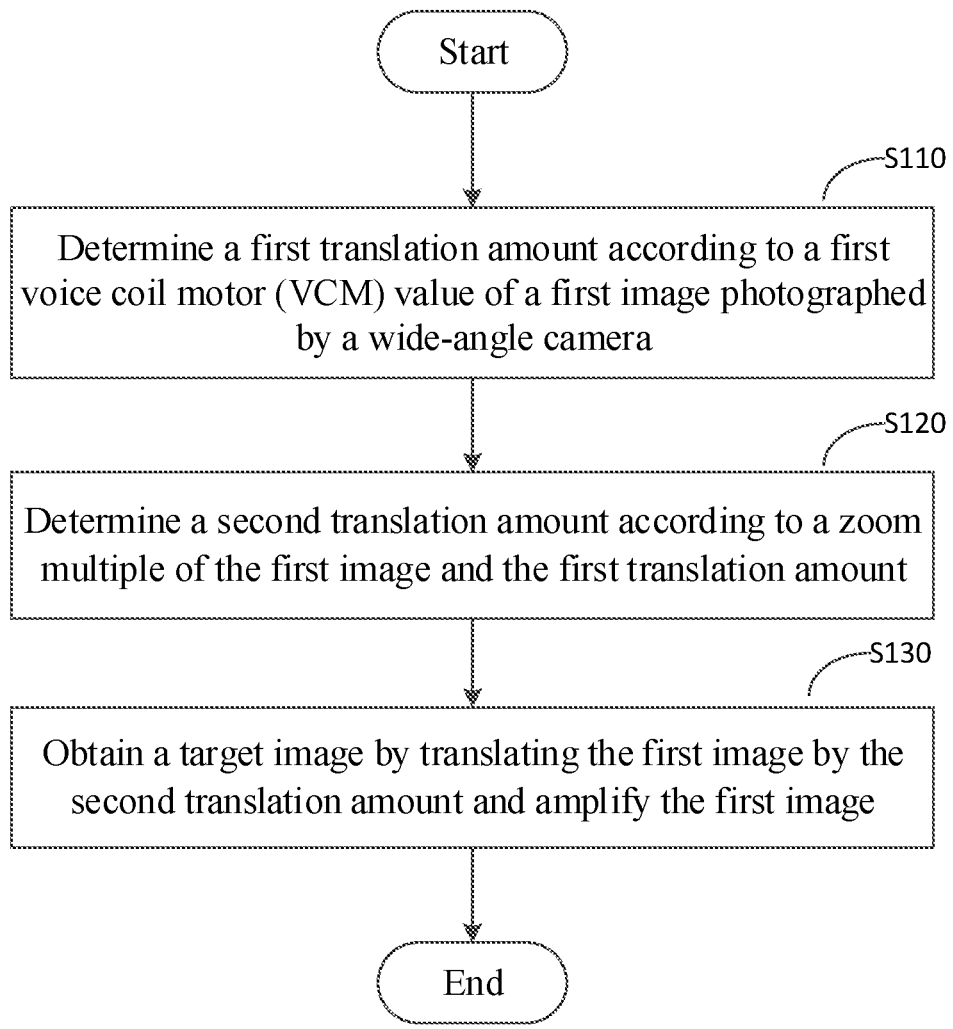
FIG. 1 is a flowchart of a method for processing image according to some embodiments.

Various exemplary embodiments, features, and aspects of the present disclosure will be described in detail below with reference to the drawings. The same reference signs in the accompanying drawings indicate elements with the same or similar functions. Although various aspects of the embodiments are shown in the drawings, unless otherwise noted, the drawings are not necessarily drawn to scale.

The dedicated word "exemplary" herein means "serving as an example, embodiment, or illustration". Any embodiment described herein as "exemplary" need not be construed as being superior to or better than other embodiments.

In addition, to better illustrate the present disclosure, numerous specific details are given in the following specific embodiments. Persons skilled in the art should understand that the present disclosure can also be implemented without certain specific details. In some embodiments, the methods, means, elements, and circuits well-known to persons skilled in the art are not described in detail in order to highlight the subject matter of the present disclosure.

FIG. 1 is a flowchart of a method for processing image according to some embodiments.

The method is applicable to a terminal. As shown in FIG. 1, the method includes the following steps.

S110. Determine a first translation amount according to a first voice coil motor (VCM) value of a first image photographed by a wide-angle camera. A VCM value is a normalized value corresponding to a magnitude of a current acting on a coil of a VCM when a camera is focused successfully.

S120. Determine a second translation amount according to a zoom multiple of the first image and the first translation amount.

S130. Translate the first image by the second translation amount and amplify the first image, to obtain a target image.

In some embodiments, a first translation amount is determined according to a first VCM value of a first image photographed by a wide-angle camera. A second translation amount is determined according to a zoom multiple of the first image and the first translation amount. The first image is translated by the second translation amount and then the first image is amplified to obtain a target image. As a result, smooth switching of zooming can be achieved, and obvious geometric jump of images within continuous focal lengths and between focal lengths is avoided, thereby providing a good zooming experience to the user.

In some embodiments, the VCM value may refer to a magnitude of a current acting on a coil of a VCM. In a fixed magnetic field, a moving position of the VCM can be controlled by changing a size of the VCM value, so that a distance between camera lenses is changed to achieve a focus function. Generally, a closer focus distance indicates a larger VCM value, and a farther focus distance indicates a smaller VCM value. However, when the distance is far to a certain extent, the VCM value basically has little change.

In some embodiments, the translation amount may refer to a translation amount between center points when a wide-angle camera and a long-focus camera photograph the same object, that is, a translation amount required when two images overlap each other. For example, the same circle is photographed, positions of the circle in two images are different, the two images can overlap by translating centers of the circle in the two images together, and this translation amount is the described translation amount.

In some embodiments, a magnitude of a current on the coil of the VCM may be normalized, to obtain a VCM value, and normalizing the magnitude of the current on the coil of the VCM may be considered as quantifying the magnitude of the current on the coil of the VCM, that is, removing the effect of the unit.

Figure 2:
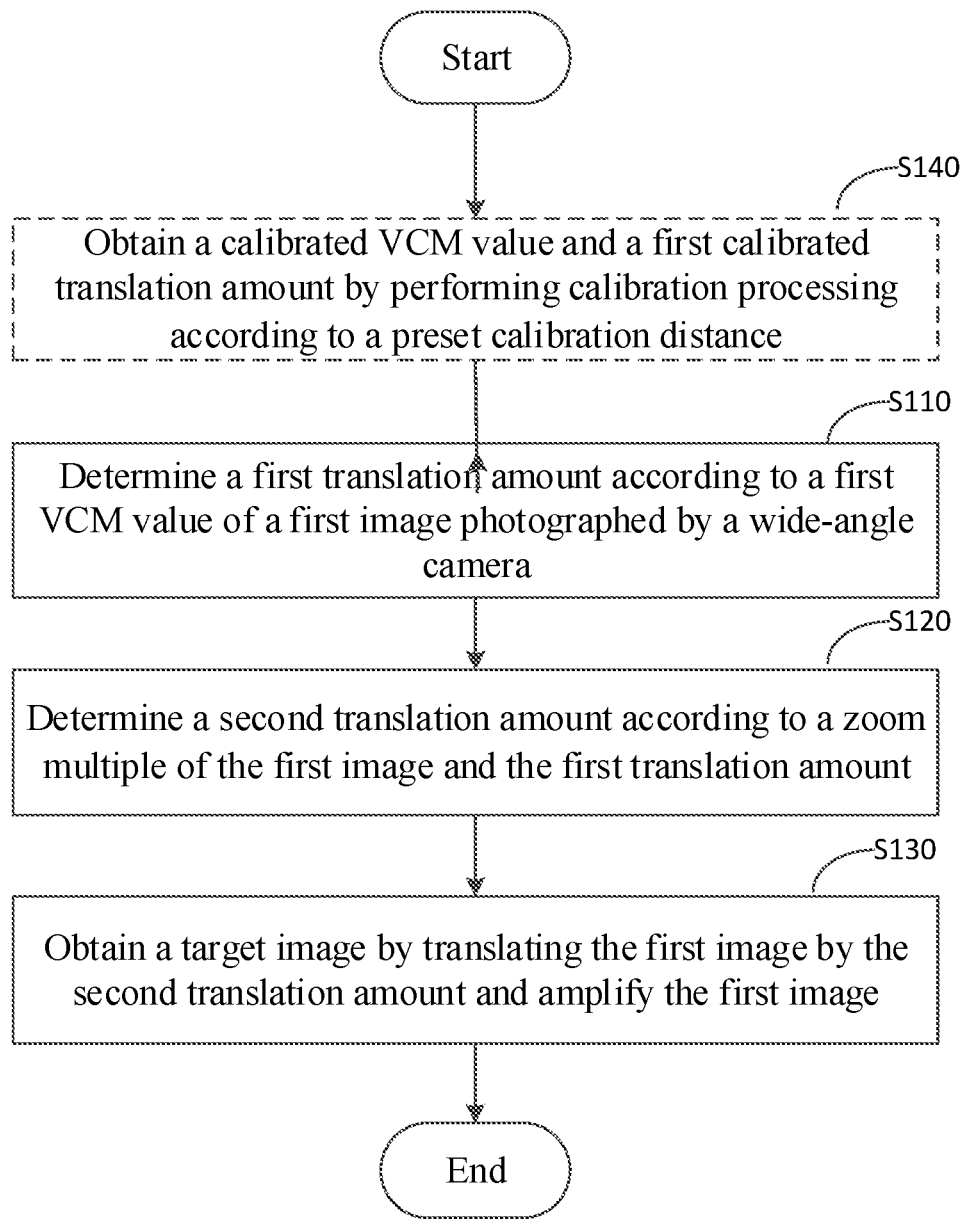
FIG. 2 is a flowchart of a method for processing image according to some embodiments.

FIG. 2 is a flowchart of a method for processing image according to some embodiments.

In some embodiments, as shown in FIG. 2, the method may further include the following steps.

S140. Perform calibration processing according to a preset calibration distance, to obtain a calibrated VCM value and a first calibrated translation amount.

Calibration means that a camera may be calibrated in advance before an electronic device (for example, a mobile phone) is used, to obtain some desired geometric parameters, and then the camera may be corrected.

The preset calibration distance is a distance between a target subject and a camera, for example, 50 cm. In this example, a calibrated VCM value (reference is made by using VCM50 below) at 50 cm and a first calibrated translation amount (reference is made by using a translation amount S50 below) at 50 cm may be obtained by performing calibration at 50 cm.

For example, a calibration object at 50 cm may be photographed, to determine a calibrated VCM value when focus is correct. In addition, a first calibrated translation amount between a wide-angle image photographed by a wide-angle camera and a long-focus image photographed by a long-focus camera at 50 cm may be determined.

It is appreciated that, the foregoing description is an example and should not be considered as a limitation on the present disclosure. During calibration, a person skilled in the art may select another calibration distance according to an actual situation. This is not limited in the present disclosure.

In some embodiments, the first translation amount may be determined according to the first VCM value in a plurality of different manners. The following describes the exemplary embodiments.

In some embodiments, in a case that the first VCM value is between a first preset VCM value and the calibrated VCM value, and a distance corresponding to the first preset VCM value is greater than the preset calibration distance, S110 of determining a first translation amount according to a first VCM value of a first image photographed by a wide-angle camera may include:

Determining the first translation amount according to the first VCM value and a first correspondence. The first correspondence is a correspondence between a translation amount between a wide-angle image and a long-focus image and a VCM value of the wide-angle image photographed by the wide-angle camera. The wide-angle image is photographed by the wide-angle camera, and the long-focus image is photographed by a long-focus camera.

The first correspondence may be obtained in advance in a statistical manner and is generic. In some embodiments, the first translation amount corresponding to the first VCM value may be rapidly determined based on the first correspondence, to improve focus efficiency and reduce a calculation amount.

In some embodiments, the first preset VCM value may be a VCM value at a focus distance of 200 cm (reference is made by using VCM200 below).

In some embodiments, the VCM200 may be obtained according to VCM50. For example, the VCM200 may be obtained according to a pre-configured automatic focus (AF) and VCM value correction relationship and the VCM50. The AF and VCM value correction relationship may include relationships between VCM values at different distances.

In some embodiments, the method may further include: obtaining a second calibrated translation amount according to the calibrated VCM value and the first correspondence; and obtaining a translation correction amount by using the first calibrated translation amount and the second calibrated translation amount.

The translation correction amount may be a difference between the first calibrated translation amount and the second calibrated translation amount. In an example, the second calibrated translation amount S50' may be obtained by using the VCM50 and the first correspondence, so that the translation correction amount $\Delta S = S50 - S50'$ is obtained by using the first calibrated translation amount S50 and the second calibrated translation amount S50'.

In some embodiments, a translation amount obtained within a specific focus distance may be corrected by using the translation correction amount, to obtain a more accurate corrected translation amount. For example, after a translation amount is obtained based on the first correspondence, the translation amount obtained based on the first correspondence may be corrected by using the translation correction amount (for example, the translation amount and the translation correction amount are added), to obtain a corrected translation amount.

In some embodiments, in a case that the focus distance is between 50 cm and 200 cm, the translation amount obtained based on the first correspondence may be corrected by using the translation correction amount, to obtain a corrected translation amount.

In some embodiments, S110 of determining a first translation amount according to a first VCM value of a first image photographed by a wide-angle camera may further include:

Correcting the first translation amount by using the translation correction amount, to obtain a corrected first translation amount.

After the first image is translated by a corrected first translation amount obtained by correcting the first translation amount, a smooth zoom image may be obtained.

In a case that the first VCM value is between a first preset VCM value and the calibrated VCM value, the first VCM value may be substituted into the first correspondence, to obtain a first translation amount Svcm, and the obtained first translation amount Svcm may be corrected by using the translation correction amount $\Delta S$, to obtain a corrected first translation amount $S = Svcm + \Delta S$.

In some embodiments, the first correspondence may be determined by using a statistical method. The following exemplarily describes a process of determining the first correspondence.

In some embodiments, the method may further include: determining the first correspondence through the following steps:

Photographing target subjects at different distances by using each electronic device in a plurality of electronic devices, to obtain a plurality of groups of wide-angle images and a plurality of groups of long-focus images, and recording a VCM value obtained when each electronic device photographs a wide-angle image at each distance. Each electronic device includes the wide-angle camera and the long-focus camera;

Determining a translation amount between a wide-angle image and a long-focus image that are photographed by each electronic device at each distance;

Performing curve fitting on the translation amount and the VCM value that are obtained by each electronic device, to obtain a plurality of groups of initial correspondences; and Averaging the plurality of groups of initial correspondences, to obtain the first correspondence.

For example, 10 electronic devices of the same batch and the same model may be obtained, and target subjects at different distances from 50 cm to 500 cm are photographed at a step of 20 cm by using each electronic device (for example, a checkerboard pattern).

For example, curve fitting may be performed in a primary or secondary fitting manner, for example, linear fitting, to obtain 10 groups of initial correspondences. The 10 groups of initial correspondences may be averaged, to obtain the first correspondence:

$y_0 = ax + b$, where a and b may represent coefficients, $y_0$ may represent a translation amount, and x may represent a VCM value.

The first correspondence may be used as a common relationship of all the electronic devices of the same batch and the same model.

It should be noted that in the above examples, although the distances of 50 cm to 500 cm are used as an example, the present disclosure is not limited thereto. A person skilled in the art may determine a testing distance according to an actual situation, or may adjust the step according to an actual situation. In addition, during testing, the VCM value and the translation amount nearly do not change after a specific distance (for example, about 200 cm). In this case, when selecting data for curve fitting, a person skilled in the art may properly select and clear the data. This is not limited in some embodiments.

In some embodiments, a first correspondence between a VCM value and a translation amount between a wide-angle image and a long-focus image is obtained in a statistical manner, when an image is processed, a first translation amount is obtained by using a VCM value obtained when a wide-angle camera photographs the wide-angle image, and a second translation amount is obtained by using the first translation amount, to implement smooth switching between images. During zooming, obvious geometric jump of images within continuous focal lengths and between focal lengths, thereby providing a good zooming experience to the user.

In some embodiments, in a case that the first VCM value is between a second preset VCM value and a first preset VCM value, the second preset VCM value is less than the first preset VCM value, and a distance corresponding to the first preset VCM value is greater than the preset calibration distance, the determining a first translation amount according to a first VCM value of a first image photographed by a wide-angle camera includes:

Using a translation amount corresponding to the first preset VCM value as the first translation amount.

In some embodiments, the second preset VCM value may be a minimum VCM value in a linear interval set when the electronic device leaves the factory (reference is made by using VCMmin below). The linear interval may represent that a moving amount of a camera and a driving current are in a linear relationship within a specific driving current range.

In a case that the first VCM value is between a second preset VCM value and a first preset VCM value, it indicates that a distance corresponding to the first preset VCM value is greater than a distance (for example, 200 cm) corresponding to the second preset VCM value. It can be learned according to a pre-test that when the distance is greater than the distance corresponding to the second preset VCM value, a translation amount does not change with a VCM value. Therefore, a translation amount corresponding to the first preset VCM value may be directly used as the first translation amount. In some embodiments, through such a method, the first translation amount may be rapidly determined in a case that a VCM value is between the second preset value and the first preset value.

In some embodiments, in a case that the first VCM value is less than the second preset VCM value, the determining a first translation amount according to a first VCM value of a first image photographed by a wide-angle camera includes:

Determining the first translation amount as 0.

In some embodiments, a value of the second preset VCM value is VCMmin. Although the VCMmin is a minimum VCM value set in factory, a case that a VCM value is less than the VCMmin may occur during actual photographing. In this case, the first translation amount is determined as 0.

In some embodiments, when the first VCM value is greater than the calibrated VCM value, digital zoom may be performed on the wide-angle image.

In some embodiments, the method may further include:

Determining a VCM value corresponding to a first preset distance and a VCM value corresponding to a second preset distance according to the calibrated VCM value and a preset VCM current relationship, the first preset distance is less than the second preset distance, and the preset VCM current relationship is a correspondence between a preset distance and a VCM value; and Respectively obtaining a translation amount corresponding to the first preset distance and a translation amount corresponding to the second preset distance by using the VCM value corresponding to the first preset distance and the VCM value corresponding to the second preset distance in the preset calibration distance.

The determining a first translation amount according to a first VCM value of a first image photographed by a wide-angle camera includes: determining the first translation amount according to the first VCM value, the calibrated VCM value, the first calibrated translation amount, the VCM value corresponding to the first preset distance, the VCM value corresponding to the second preset distance, the translation amount corresponding to the first preset distance, and the translation amount corresponding to the second preset distance.

According to the method, in some embodiments, the fluctuation of VCM values and the fluctuation of translation amounts obtained for a plurality of times at the same distance are ignored within a tolerable range, simple focus smooth switching can be completed, a calculation amount can be reduced, and calculation resources can be saved.

For example, the first preset distance may be 100 cm, and the second preset distance may be 200 cm.

In some embodiments, the preset VCM current relationship may be obtained in a statistical manner, and a specific manner of determining the preset VCM current relationship is not limited in the present disclosure.

The preset VCM current relationship may be the AF and VCM value correction relationship.

After the calibrated VCM value is obtained, VCM values at different preset distances may be determined based on the preset VCM current relationship. For example, VCM values corresponding 100 cm and 200 cm may be obtained.

After a VCM value corresponding to the first preset distance and a VCM value corresponding to the second preset distance of each camera are obtained, in the preset calibration distance (50 cm), a VCM value of each camera is set to the VCM value corresponding to the first preset distance and the VCM value corresponding to the second preset distance respectively. A target subject are respectively photographed by the wide-angle camera and the long-focus camera, and translation amounts corresponding to the two VCM values are determined by using a long-focus image and a wide-angle image that are obtained through photographing.

In some embodiments, the determining the first translation amount according to the first VCM value, the calibrated VCM value, the first calibrated translation amount, the VCM value corresponding to the first preset distance, and the VCM value corresponding to the second preset distance may include:

Determining that the first translation amount is the first calibrated translation amount in a case that the first VCM value is greater than or equal to ½ of a sum of the calibrated VCM value and the VCM value corresponding to the first preset distance; or Determining that the first translation amount is the translation amount corresponding to the first preset distance in a case that the first VCM value is greater than or equal to ½ of a sum of the VCM value corresponding to the first preset distance and the VCM value corresponding to the second preset distance and less than ½ of a sum of the calibrated VCM value and the VCM value corresponding to the first preset distance; or Determining that the first translation amount is the translation amount corresponding to the second preset distance in a case that the first VCM value is greater than or equal to a second preset VCM value and less than ½ of a sum of the VCM value corresponding to the first preset distance and the VCM value corresponding to the second preset distance, the second preset VCM value is less than a first preset VCM value, and a distance corresponding to the first preset VCM value is greater than the preset calibration distance; or Determining the first translation amount as 0 in a case that the first VCM value is less than the second preset VCM value.

It should be noted that the above descriptions of the preset calibration distance, the first preset distance, and the second preset distance seem to be an example and should not be considered as a limitation on the present disclosure, and a person skilled in the art can determine an actual size of each distance according to an actual situation. This is not limited in the present disclosure.

In some embodiments, the determining a first translation amount according to a first VCM value of a first image photographed by a wide-angle camera may include: determining the first translation amount according to the first VCM value, the calibrated VCM value, the first calibrated translation amount, and a second preset VCM value. The second preset VCM value is less than a first preset VCM value, and a distance corresponding to the first preset VCM value is greater than the preset calibration distance.

In some embodiments, the calibrated VCM value may be VCM80. That is, the calibrated VCM value may be a VCM value obtained when calibration is performed at a calibration distance of 80 cm, and the first calibrated translation amount may be a translation amount obtained when calibration is performed at the calibration distance of 80 cm.

In some embodiments, the determining the first translation amount according to the first VCM value, the calibrated VCM value, the first calibrated translation amount, and a second preset VCM value may include:

Determining that the first translation amount is the first calibrated translation amount in a case that the first VCM value is greater than or equal to ½ of a sum of the calibrated VCM value and the second preset VCM value; or Determining that the first translation amount is ½ of the first calibrated translation amount in a case that the first VCM value is greater than or equal to the second preset VCM value and less than ½ of a sum of the calibrated VCM value and the second preset VCM value; or Determining the first translation amount as 0 in a case that the first VCM value is less than the second preset VCM value.

It is appreciated that, the above description is an example, and a person skilled in the art can further determine an actual calibration distance, obtain an actual calibrated VCM value, and determine an actual size of the second preset VCM value according to a requirement. This is not limited in the present disclosure.

Through the above method, in some embodiments, the first translation amount corresponding to the first VCM value can be simply obtained, and operation costs can be reduced.

After the first translation amount is determined, the second translation amount can be determined according to the first translation amount and a zoom multiple of the first image in some embodiments. The following describes a process of determining the second translation amount.

In some embodiments, S120 of determining a second translation amount according to a zoom multiple of the first image and the first translation amount may include:

Determining the second translation amount according to the following formula:

$$S' = \frac{S}{z_0 - 1} * z - \frac{S}{z_0 - 1}.$$

z represents the zoom multiple of the first image, S' represents the second translation amount, $z_0$ represents a preset zoom multiple, and S represents the first translation amount.

That is, the second translation amount may be obtained by using a product of the first translation amount and a coefficient, and the coefficient is proportional to the zoom multiple of the first image, and is inversely proportional to the preset zoom multiple.

By using the formula, in some embodiments, a second translation amount in a current zoom multiple may be obtained according to the first translation amount, and translation transformation is performed on the first image by using the second translation amount, so that jump effect can be avoided during zooming, and smooth transition of zooming is achieved, to improve user experience.

In some embodiments, the preset zoom multiple of the first image may be a zoom multiple unique to the long-focus camera or wide-angle camera. In an example, it is assumed that an equivalent focal length of the long-focus camera is 36 mm, and an equivalent focal length of the wide-angle camera is 18 mm, the unique zoom multiple is 2. In another example, it is assumed the equivalent focal length of the long-focus camera is 36 mm, and the equivalent focal length of the wide-angle camera is 12 mm, the unique zoom multiple is 3.

In some embodiments, the premise of obtaining the formula is that: when the zoom multiple is 1, the translation amount is 0.

The second translation amount is determined more accurately by using the formula when the following condition is met: a focal length (or referred to as a zoom length) corresponding to a current zoom multiple falls within a focal length of the wide-angle camera.

In another some embodiment, if the focal length corresponding to the current zoom multiple falls within a focal length of the long-focus camera, it is not necessary to calculate the second translation amount by using the formula, and digital zoom is directly performed on the long-focus image, to obtain a zoomed long-focus image.

In another some embodiment, if light is relatively dark when an image is photographed, for example, when brightness of the wide-angle image is less than a brightness threshold, digital zoom is performed by using the wide-angle image no matter in which zoom length the current zoom multiple falls without a process of switching to the long-focus image.

In another some embodiment, if a photographing distance is close (for example, less than 50 cm), digital zoom is performed by using the wide-angle image no matter in which zoom length the current zoom multiple falls without a process of switching to the long-focus image.

It should be noted that in some embodiments, the translation amount generally refers to a translation amount in a horizontal axis direction, and a translation amount in a longitudinal axis direction generally does not change with a photographing distance (the horizontal/longitudinal axis direction is related to horizontal and longitudinal arrangement, which can be determined according to an actual situation). Therefore, the translation amount in the longitudinal axis direction can be obtained when calibration is performed at 50 cm.

It should be noted that the foregoing describes the wide-angle camera and the long-focus camera, but the present disclosure is not limited thereto. Specific zoom lengths of the wide-angle camera and the long-focus camera are not limited in the present disclosure, and a person skilled in the art can select a wide-angle camera and a long-focus camera with different zoom lengths according to requirements. This is not limited in the present disclosure.

In some embodiments, a first translation amount is determined according to a VCM value of a first image photographed by a wide-angle camera, a second translation amount is determined according to a zoom multiple of the first image and the first translation amount, and the first image is translated by the second translation amount and then the first image is amplified to obtain a target image. As a result, smooth switching of zooming can be achieved, and obvious geometric jump of images within continuous focal lengths and between focal lengths can be avoided, thereby providing a good zooming experience to the user.

In some embodiments, smooth switching can be achieved by only obtaining translation amounts of a wide-angle image and a long-focus image without considering the angular rotation, a calculation process is simple, and calculation resources are saved.

In addition, in some embodiments, only once calibration needs to be performed on an electronic device, and a translation amount at a current photographing distance can be obtained based on a result of the calibration and based on a first correspondence obtained through statistics with reference to a first VCM value for photographing a wide-angle image. The process is simple, and time, cost and calculation resources can be saved.

Figure 3:
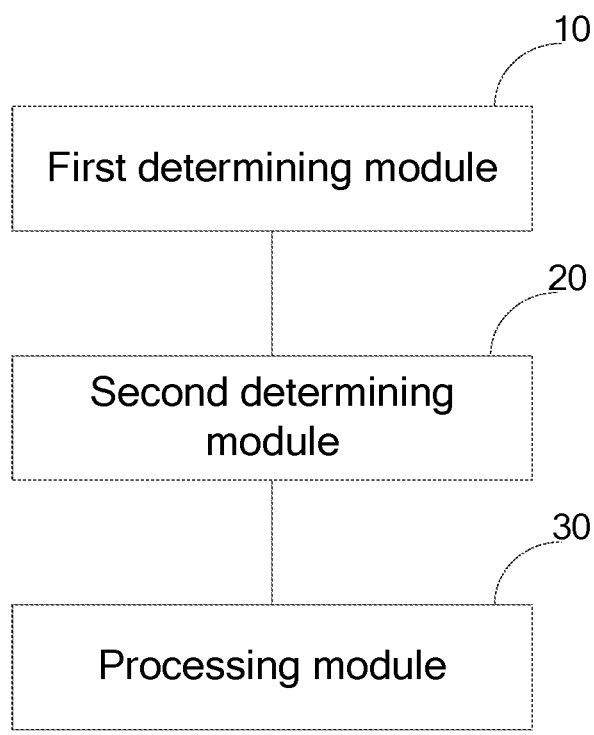
FIG. 3 is a block diagram of an apparatus for processing image according to some embodiments.

FIG. 3 is a block diagram of an apparatus for processing image according to some embodiments.

As shown in FIG. 3, the apparatus includes: a first determining module 10 configured to determine a first translation amount according to a first VCM value of a first image photographed by a wide-angle camera, a second determining module 20 connected to the first determining module 10 and configured to determine a second translation amount according to a zoom multiple of the first image and the first translation amount; and a processing module 30 connected to the second determining module 20 and configured to translate the first image by the second translation amount and amplify the first image to obtain a target image. A VCM value is a normalized value corresponding to a magnitude of a current acting on a coil of a VCM when a camera is focused successfully.

Through matching of the modules, in some embodiments, a first translation amount is determined according to a first VCM value of a first image photographed by a wide-angle camera, a second translation amount is determined according to a zoom multiple of the first image and the first translation amount, and the first image is translated by the second translation amount and then the first image is amplified to obtain a target image. As a result, smooth switching of zooming can be achieved, and obvious geometric jump of images within continuous focal lengths and between focal lengths is avoided, thereby providing a good zooming experience to the user.

In some embodiments, the apparatus further includes: a calibration module connected to the first determining module and configured to perform calibration processing according to a preset calibration distance, to obtain a calibrated VCM value and a first calibrated translation amount.

In some embodiments, in a case that the first VCM value is between a first preset VCM value and the calibrated VCM value, a distance corresponding to the first preset VCM value is greater than the preset calibration distance, and the determining a first translation amount according to a first VCM value of a first image photographed by a wide-angle camera includes: determining the first translation amount according to the first VCM value and a first correspondence. The first correspondence is a correspondence between a translation amount between a wide-angle image and a long-focus image and a VCM value of the wide-angle image photographed by the wide-angle camera, the wide-angle image is photographed by the wide-angle camera, and the long-focus image is photographed by a long-focus camera.

In some embodiments, the apparatus further includes: a third determining module, configured to obtain a second calibrated translation amount according to the calibrated VCM value and the first correspondence, and further configured to obtain a translation correction amount by using the first calibrated translation amount and the second calibrated translation amount.

In some embodiments, the determining a first translation amount according to a first VCM value of a first image photographed by a wide-angle camera further includes: correcting the first translation amount by using the translation correction amount, to obtain a corrected first translation amount.

In some embodiments, in the apparatus, the first correspondence is determined through the following steps:

Photographing target subjects at different distances by using each electronic device in a plurality of electronic devices, to obtain a plurality of groups of wide-angle images and a plurality of groups of long-focus images, and recording a VCM value obtained when each electronic device photographs a wide-angle image at each distance, each electronic device includes the wide-angle camera and the long-focus camera;

Determining a translation amount between a wide-angle image and a long-focus image that are photographed by each electronic device at each distance;

Performing curve fitting on the translation amount and the VCM value that are obtained by each electronic device, to obtain a plurality of groups of initial correspondences; and Averaging the plurality of groups of initial correspondences, to obtain the first correspondence.

In some embodiments, in a case that the first VCM value is between a second preset VCM value and a first preset VCM value, the second preset VCM value is less than the first preset VCM value, a distance corresponding to the first preset VCM value is greater than the preset calibration distance, and the determining a first translation amount according to a first VCM value of a first image photographed by a wide-angle camera includes: using a translation amount corresponding to the first preset VCM value as the first translation amount.

In some embodiments, in a case that the first VCM value is less than the second preset VCM value, the determining a first translation amount according to a first VCM value of a first image photographed by a wide-angle camera includes: determining the first translation amount as 0.

In some embodiments, the apparatus further includes: a fourth determining module configured to determine a VCM value corresponding to a first preset distance and a VCM value corresponding to a second preset distance according to the calibrated VCM value and a preset VCM current relationship. The first preset distance is less than the second preset distance, and the preset VCM current relationship is a correspondence between a preset distance and a VCM value. The fourth determining module is further configure to respectively obtain a translation amount corresponding to the first preset distance and a translation amount corresponding to the second preset distance by using the VCM value corresponding to the first preset distance and the VCM value corresponding to the second preset distance in the preset calibration distance. The determining a first translation amount according to a first VCM value of a first image photographed by a wide-angle camera includes: determining the first translation amount according to the first VCM value, the calibrated VCM value, the first calibrated translation amount, the VCM value corresponding to the first preset distance, the VCM value corresponding to the second preset distance, the translation amount corresponding to the first preset distance, and the translation amount corresponding to the second preset distance.

In some embodiments, the determining the first translation amount according to the first VCM value, the calibrated VCM value, the first calibrated translation amount, the VCM value corresponding to the first preset distance, and the VCM value corresponding to the second preset distance includes:

Determining that the first translation amount is the first calibrated translation amount in a case that the first VCM value is greater than or equal to ½ of a sum of the calibrated VCM value and the VCM value corresponding to the first preset distance; or Determining that the first translation amount is the translation amount corresponding to the first preset distance in a case that the first VCM value is greater than or equal to ½ of a sum of the VCM value corresponding to the first preset distance and the VCM value corresponding to the second preset distance and less than ½ of a sum of the calibrated VCM value and the VCM value corresponding to the first preset distance; or Determining that the first translation amount is the translation amount corresponding to the second preset distance in a case that the first VCM value is greater than or equal to a second preset VCM value and less than ½ of a sum of the VCM value corresponding to the first preset distance and the VCM value corresponding to the second preset distance, the second preset VCM value is less than a first preset VCM value, and a distance corresponding to the first preset VCM value is greater than the preset calibration distance; or Determining the first translation amount as 0 in a case that the first VCM value is less than the second preset VCM value.

In some embodiments, the determining a first translation amount according to a first VCM value of a first image photographed by a wide-angle camera includes: determining the first translation amount according to the first VCM value, the calibrated VCM value, the first calibrated translation amount, and a second preset VCM value. The second preset VCM value is less than a first preset VCM value, and a distance corresponding to the first preset VCM value is greater than the preset calibration distance.

In some embodiments, the determining the first translation amount according to the first VCM value, the calibrated VCM value, the first calibrated translation amount, and a second preset VCM value includes:

Determining that the first translation amount is the first calibrated translation amount in a case that the first VCM value is greater than or equal to ½ of a sum of the calibrated VCM value and the second preset VCM value; or Determining that the first translation amount is ½ of the first calibrated translation amount in a case that the first VCM value is greater than or equal to the second preset VCM value and less than ½ of a sum of the calibrated VCM value and the second preset VCM value; or Determining the first translation amount as 0 in a case that the first VCM value is less than the second preset VCM value.

In some embodiments, the determining a second translation amount according to a zoom multiple of the first image and the first translation amount includes: determining the second translation amount according to the following formula:

$$S' = \frac{S}{z_0 - 1} * z - \frac{S}{z_0 - 1},$$

z represents the zoom multiple of the first image, S' represents the second translation amount, $z_0$ represents a preset zoom multiple, and S represents the first translation amount.

It should be noted that the apparatus for processing image is an apparatus corresponding to the method for processing image, and for a specific description, reference is made to the description of the method for processing image. Details are not described herein again.

Figure 4:
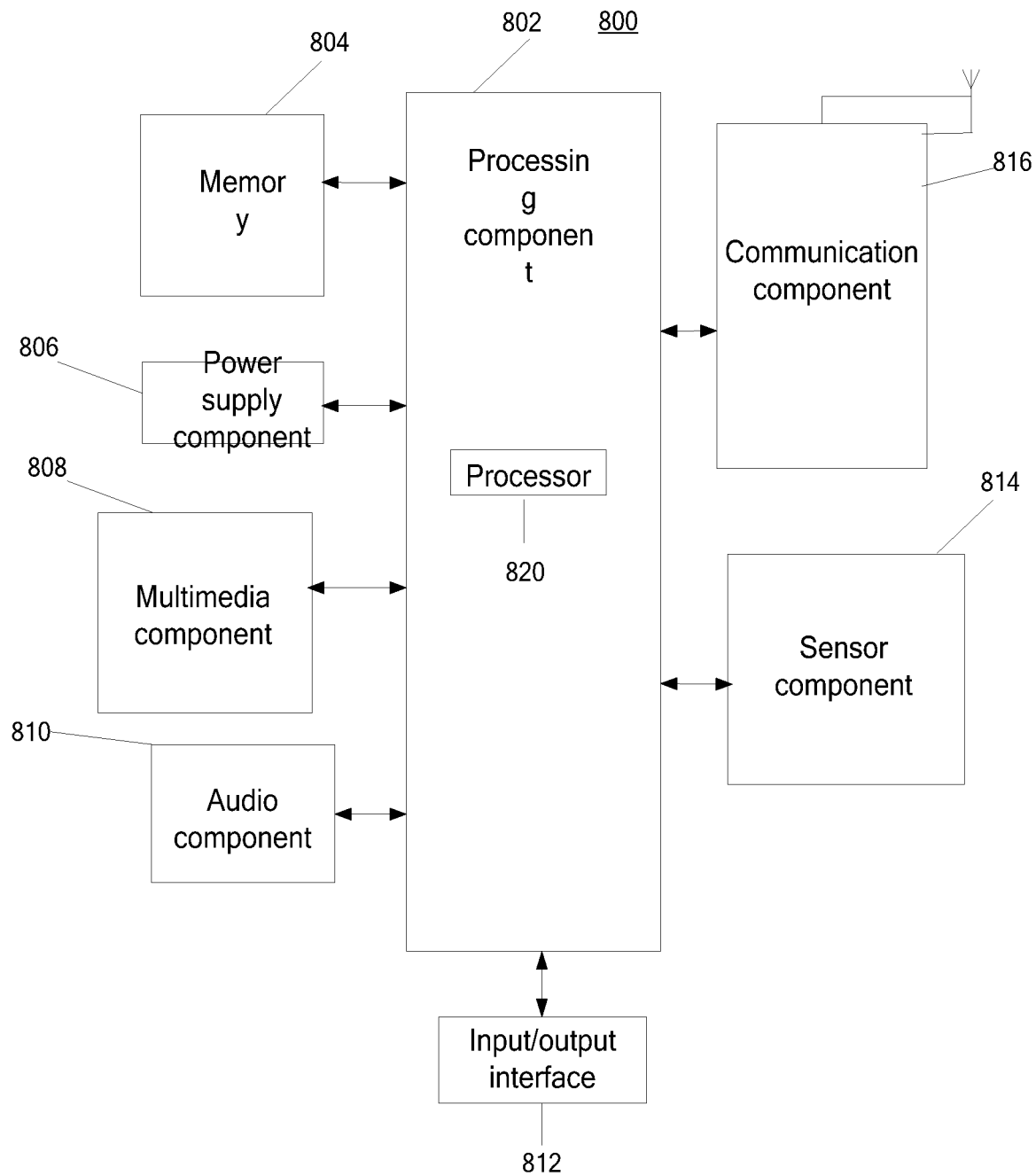
FIG. 4 is a block diagram of an apparatus for processing image according to some embodiments.

FIG. 4 is a block diagram of an apparatus for processing image according to some embodiments. For example, an apparatus 800 may be a mobile phone, a computer, a digital broadcast terminal, a message transceiving device, a gaming console, a tablet device, a medical device, a fitness device, a personal digital assistant, or the like.

Referring to FIG. 4, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 typically controls the overall operation of the apparatus 800, for example, operations associated with display, phone calls, data communications, camera operations, and recording operations. The processing component 802 may include one or more processors 820 to execute instructions to complete all or some of the steps of the method described above. In addition, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support operations on the apparatus 800. Examples of such data include instructions for any application or method operating on the apparatus 800, contact data, phone book data, messages, pictures, videos, etc. The memory 804 may be implemented by any type of volatile or non-transitory storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 806 supplies power to various components of the apparatus 800. The power supply component 806 may include a power management system, one or more power supplies, and other components associated with power generating, management, and distribution for the apparatus 800.

The multimedia component 808 includes a screen providing an output interface between the apparatus 800 and a user. In some embodiments, the screen may include a liquid crystal display (LCD) and a touch panel (TP). If the screen includes the TP, the screen may be implemented as a touch screen to receive input signals from the user. The TP includes one or more touch sensors to sense touches, swipes, and gestures on the TP. The touch sensors may not only sense boundaries of the touch or swipe action, but also detect the duration and pressure associated with the touch or swipe action. In some embodiments, the multimedia component 808 includes a front-facing camera and/or a rear-facing camera. The front-facing camera and/or the rear-facing camera can receive external multimedia data when the apparatus 800 is in an operating mode, such as a shooting mode or a video mode. Each front-facing camera and rear-facing camera may be a fixed optical lens system or have a focal length and optical zoom capability.

The audio component 810 is configured to output and/or input audio signals. For example, the audio component 810 includes a microphone (MIC) configured to receive external audio signals when the apparatus 800 is in an operating mode, such as a call mode, a recording mode, and a voice recognition mode. The received audio signals may be further stored in the memory 804 or sent via the communication component 816. In some embodiments, the audio component 810 further includes a speaker for outputting audio signals.

The I/O interface 812 provides an interface between the processing component 802 and a peripheral interface module, and the peripheral interface module may be a keyboard, a click wheel, a button, etc. The buttons may include, but are not limited to: a home button, a volume button, a start button, and a lock button.

The sensor component 814 includes one or more sensors for providing status assessment of various aspects of the apparatus 800. For example, the sensor component 814 may detect an on/off state of the apparatus 800 and relative positions of the components. For example, the components are a display and a keypad of the apparatus 800. The sensor component 814 may further detect position changes of the apparatus 800 or a component of the apparatus 800, presence or absence of contact between the user and the apparatus 800, positions of the apparatus 800 or acceleration/deceleration of the apparatus 800, and temperature changes of the apparatus 800. The sensor component 814 may include a proximity sensor configured to detect the presence of nearby objects without any physical contact. The sensor component 814 may further include an optical sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate communication between the apparatus 800 and other devices by wired or wireless means. The apparatus 800 can access a wireless network which is based on a communications standard, such as Wi-Fi, 2G, 3G, or a combination thereof. In an exemplary embodiment, the communication component 816 receives broadcast signals or broadcast-related information from an external broadcast management system via a broadcast channel. In an exemplary embodiment, the communication component 816 further includes a near-field communication (NFC) module to facilitate short-range communication. For example, the NFC module may be implemented based on the radio frequency identification (RFID) technology, infrared data association (IrDA) technology, ultra-wideband (UWB) technology, Bluetooth (BT) technology, and other technologies.

In an exemplary embodiment, the apparatus 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the method described above.

In an exemplary embodiment, a non-transitory computer-readable storage medium is provided, for example a memory 804 including computer program instructions. The above computer program instructions may be executed by the processor 820 of the apparatus 800 to complete the above method.

The present disclosure may be a system, method, and/or computer program product. The computer program product may include a computer-readable storage medium storing computer-readable program instructions for enabling a processor to implement various aspects of the present disclosure.

The computer-readable storage medium may be a tangible device that can hold and store instructions used by an instruction execution device. The computer-readable storage medium may be, for example, but not limited to, an electrical storage device, a magnetic storage device, an optical storage device, an electromagnetic storage device, a semiconductor storage device, or any suitable combination of the foregoing devices. More specific examples (non-exhaustive list) of the computer-readable storage medium include: a portable computer disk, a hard disk, a random access memory (RAM), a read-only memory (ROM), an erasable programmable ROM (EPROM), a flash memory, a static RAM (SRAM), a compact disc ROM (CD-ROM), a digital versatile disc (DVD), a memory stick, a floppy disk, and a mechanical encoding device such as a protruding structure that stores an instruction in a hole card or a groove, and any suitable combination of the foregoing. The computer-readable storage medium herein is not interpreted as a transient signal, such as radio waves or other freely propagating electromagnetic waves, electromagnetic waves propagating through waveguides or other transmission media (for example, light pulses through fiber optic cables), or electrical signals propagating through wires.

The computer-readable program instructions described herein can be downloaded from the computer-readable storage medium to various computing/processing devices, or downloaded to an external computer or external storage device over a network, such as the Internet, a local area network, a wide area network, and/or a wireless network. The network may include a copper transmission cable, optical fiber transmission, wireless transmission, a router, a firewall, a switch, a gateway computer, and/or an edge server. The network adapter card or network interface in each computing/processing device receives the computer-readable program instructions from the network, and forwards the computer-readable program instructions for storage in the computer-readable storage medium in each computing/processing device.

The computer program instructions used to perform the operations of the present disclosure may be assembly instructions, instruction set architecture (ISA) instructions, machine instructions, machine-related instructions, microcode, firmware instructions, state setting data, or source code or target code written in any combination of one or more programming languages. The programming languages include object-oriented programming languages such as Smalltalk and C++, and conventional procedural programming languages such as C language or similar programming languages. The computer-readable program instructions can be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer over any type of network, including a local area network (LAN) or a wide area network (WAN), or may be connected to an external computer (for example, connected over the Internet by using an Internet service provider). In some embodiments, an electronic circuit, such as a programmable logic circuit, a field programmable gate array (FPGA), or a programmable logic array (PLA), can be customized by using status information of the computer-readable program instructions. The computer-readable program instructions are executed to implement various aspects of the present disclosure.

Various aspects of the present disclosure are described with reference to flowcharts and/or block diagrams of methods, devices (systems), and computer program products according to embodiments of the present disclosure. It should be understood that each block of the flowcharts and/or block diagrams, and combinations of blocks in the flowcharts and/or block diagrams, can be implemented by computer-readable program instructions.

The computer-readable program instructions can be provided to a processor of a general-purpose computer, a dedicated computer, or other programmable data processing device, to produce a machine that makes the instruction when executed by the processor of the computer or other programmable data processing devices to implement the functions/actions specified in one or more blocks in the flowcharts and/or block diagrams. The computer-readable program instructions may be stored in a computer-readable storage medium. These instructions make computers, programmable data processing apparatuses, and/or other devices work in a specific manner. The computer-readable medium storing the instructions includes an artifact, which includes instructions for implementing various aspects of the functions/actions specified in one or more blocks in the flowcharts and/or block diagrams.

The computer-readable program instructions may be loaded onto a computer, another programmable data processing apparatus, or another device, so that a series of steps are executed on the computer, another programmable data processing apparatus, or another equipment to produce a computer-implemented process. In this way, the instructions executed on the computer, another programmable data processing apparatus, or another device implement the functions/actions specified in one or more blocks in the flowcharts and/or block diagrams.

The flowcharts and block diagrams in the accompanying drawings illustrate system architectures, functions and operations that may be implemented by the system, method, and computer program product according to the embodiments of the present disclosure. Each block in the flowcharts or block diagrams may represent a module, a program segment, or a part of code, and the module, the program segment, or the part of code contains one or more executable instructions used to implement specified logical functions. It should also be noted that, in some alternative implementations, functions marked in the blocks may also take place in an order different from the order marked in the accompanying drawings. For example, two consecutive blocks can actually be executed in parallel, or sometimes can be executed in the reverse order, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

The embodiments of the present disclosure have been described above, and the above description is exemplary, not exhaustive, and is not limited to the disclosed embodiment. It is apparent to those skilled in the art that many modifications and changes may be made without departing from the scope and spirit of the described embodiments. The terms used herein are selected to best explain principles of the examples, practical applications, or improvements to technologies in the market, or to enable other persons of ordinary skill in the art to understand the examples disclosed herein.

What is claimed is:

1. A method for processing image, comprising:
    determining a first translation amount based on a first voice coil motor (VCM) value of a first image photographed by a wide-angle camera, wherein the VCM value is a normalized value corresponding to a magnitude of a current acting on a coil of a VCM in response to successful focusing of the camera;
    determining a second translation amount based on a zoom multiple of the first image and the first translation amount; and
    obtaining a target image by translating the first image by the second translation amount and amplifying the first image.

2. The method according to claim 1, further comprising:
    obtaining a calibrated VCM value and a first calibrated translation amount by performing calibration processing based on a preset calibration distance.

3. The method according to claim 2, wherein based on that the first VCM value is between a first preset VCM value and the calibrated VCM value, and a distance corresponding to the first preset VCM value is greater than the preset calibration distance, said determining a first translation amount according to a first VCM value of a first image photographed by a wide-angle camera comprises:
    determining the first translation amount based on the first VCM value and a first correspondence, wherein the first correspondence is a correspondence of a translation amount between a wide-angle image and a long-focus image, and a VCM value of the wide-angle image photographed by the wide-angle camera,
    wherein the wide-angle image is photographed by the wide-angle camera, and the long-focus image is photographed by a long-focus camera.

4. The method according to claim 3, further comprising:
    obtaining a second calibrated translation amount based on the calibrated VCM value and the first correspondence; and
    obtaining a translation correction amount by using the first calibrated translation amount and the second calibrated translation amount.

5. The method according to claim 4, wherein said determining a first translation amount based on a first VCM value of a first image photographed by a wide-angle camera further comprises:
    obtaining corrected first translation amount by correcting the first translation amount by using the translation correction amount.

6. The method according to claim 3, further comprising:
determining the first correspondence through the following steps:
    obtaining a plurality of groups of wide-angle images and a plurality of groups of long-focus images by photographing target subjects at different distances by using a plurality of electronic devices, and recording a VCM value obtained when each of the plurality of electronic devices photographs a wide-angle image at each distance, wherein each electronic device comprises the wide-angle camera and the long-focus camera;
    determining a translation amount between a wide-angle image and a long-focus image that are photographed by each electronic device at each distance;

obtaining a plurality of groups of initial correspondences by performing curve fitting on the translation amount and the VCM value that are obtained by each electronic device; and obtaining the first correspondence by averaging the plurality of groups of initial correspondences.

7. The method according to claim 2, wherein based on that the first VCM value is between a second preset VCM value and a first preset VCM value, the second preset VCM value is less than the first preset VCM value, and a distance corresponding to the first preset VCM value is greater than the preset calibration distance, said determining a first translation amount based on a first VCM value of a first image photographed by a wide-angle camera comprises:

using a translation amount corresponding to the first preset VCM value as the first translation amount.

8. The method according to claim 7, wherein based on that the first VCM value is less than the second preset VCM value, said determining a first translation amount based on a first VCM value of a first image photographed by a wide-angle camera comprises:

determining the first translation amount as 0.

9. The method according to claim 2, further comprising:

determining a VCM value corresponding to a first preset distance and a VCM value corresponding to a second preset distance based on the calibrated VCM value and a preset VCM current relationship, wherein the first preset distance is less than the second preset distance, and the preset VCM current relationship is a correspondence between a preset distance and a VCM value; and respectively obtaining a translation amount corresponding to the first preset distance and a translation amount corresponding to the second preset distance by using the VCM value corresponding to the first preset distance and the VCM value corresponding to the second preset distance in the preset calibration distance, wherein said determining a first translation amount based on a first VCM value of a first image photographed by a wide-angle camera comprises:

determining the first translation amount based on the first VCM value, the calibrated VCM value, the first calibrated translation amount, the VCM value corresponding to the first preset distance, the VCM value corresponding to the second preset distance, the translation amount corresponding to the first preset distance, and the translation amount corresponding to the second preset distance.

10. The method according to claim 9, wherein said determining the first translation amount based on the first VCM value, the calibrated VCM value, the first calibrated translation amount, the VCM value corresponding to the first preset distance, and the VCM value corresponding to the second preset distance comprises:

determining that the first translation amount is the first calibrated translation amount based on that the first VCM value is greater than or equal to ½ of a sum of the calibrated VCM value and the VCM value corresponding to the first preset distance; or determining that the first translation amount is the translation amount corresponding to the first preset distance based on that the first VCM value is greater than or equal to ½ of a sum of the VCM value corresponding to the first preset distance and the VCM value corresponding to the second preset distance and less than ½ of a sum of the calibrated VCM value and the VCM value corresponding to the first preset distance; or determining that the first translation amount is the translation amount corresponding to the second preset distance based on that the first VCM value is greater than or equal to a second preset VCM value and less than ½ of a sum of the VCM value corresponding to the first preset distance and the VCM value corresponding to the second preset distance, wherein the second preset VCM value is less than a first preset VCM value, and a distance corresponding to the first preset VCM value is greater than the preset calibration distance; or determining the first translation amount as 0 based on that the first VCM value is less than the second preset VCM value.

11. The method according to claim 2, wherein said determining a first translation amount based on a first VCM value of a first image photographed by a wide-angle camera comprises:

determining the first translation amount based on the first VCM value, the calibrated VCM value, the first calibrated translation amount, and a second preset VCM value, wherein the second preset VCM value is less than a first preset VCM value, and a distance corresponding to the first preset VCM value is greater than the preset calibration distance.

12. The method according to claim 11, wherein said determining the first translation amount based on the first VCM value, the calibrated VCM value, the first calibrated translation amount, and a second preset VCM value comprises:

determining that the first translation amount is the first calibrated translation amount based on that the first VCM value is greater than or equal to ½ of a sum of the calibrated VCM value and the second preset VCM value; or determining that the first translation amount is ½ of the first calibrated translation amount based on that the first VCM value is greater than or equal to the second preset VCM value and less than ½ of a sum of the calibrated VCM value and the second preset VCM value; or determining the first translation amount as 0 based on that the first VCM value is less than the second preset VCM value.

13. The method according to claim 1, wherein said determining a second translation amount based on a zoom multiple of the first image and the first translation amount comprises:

determining the second translation amount based on the following formula:

$$S' = \frac{S}{z_0 - 1} * z - \frac{S}{z_0 - 1},$$

where z represents the zoom multiple of the first image, S' represents the second translation amount, $z_0$ represents a preset zoom multiple, and S represents the first translation amount.

14. An apparatus for processing image, comprising:
a first determining module, configured to determine a first translation amount based on a first voice coil motor (VCM) value of a first image photographed by a wide-angle camera, wherein the VCM value is a normalized value corresponding to a magnitude of a current acting on a coil of a VCM in response to successful focusing of the camera;

a second determining module, connected to the first determining module, and configured to determine a second translation amount based on a zoom multiple of the first image and the first translation amount; and a processing module, connected to the second determining module, and configured to obtain a target image by translating the first image by the second translation amount and amplify the first image.

15. The apparatus according to claim 14, further comprising:

a calibration module, connected to the first determining module and configured to obtain a calibrated VCM value and a first calibrated translation amount by performing calibration processing based on a preset calibration distance.

16. The apparatus according to claim 15, wherein based on that the first VCM value is between a first preset VCM value and the calibrated VCM value, and a distance corresponding to the first preset VCM value is greater than the preset calibration distance, said determining a first translation amount according to a first VCM value of a first image photographed by a wide-angle camera comprises:

determining the first translation amount based on the first VCM value and a first correspondence, wherein the first correspondence is a correspondence of a translation amount between a wide-angle image and a long-focus image, and a VCM value of the wide-angle image photographed by the wide-angle camera, wherein the wide-angle image is photographed by the wide-angle camera, and the long-focus image is photographed by a long-focus camera.

17. The apparatus according to claim 16, further comprising:

a third determining module, configured to obtain a second calibrated translation amount based on the calibrated VCM value and the first correspondence; and further configured to obtain a translation correction amount by using the first calibrated translation amount and the second calibrated translation amount.

18. The apparatus according to claim 17, wherein the determining a first translation amount based on a first VCM value of a first image photographed by a wide-angle camera further comprises:

obtain a corrected first translation amount by correcting the first translation amount by using the translation correction amount.

19. The apparatus according to claim 16, wherein the first correspondence is determined through the following steps:

obtain a plurality of groups of wide-angle images and a plurality of groups of long-focus images by photographing target subjects at different distances by using a plurality of electronic devices, and record a VCM value obtained when each of the plurality of electronic devices photographs a wide-angle image at each distance, wherein each electronic device comprises the wide-angle camera and the long-focus camera;

determine a translation amount between a wide-angle image and a long-focus image that are photographed by each electronic device at each distance;

obtain a plurality of groups of initial correspondences by performing curve fitting on the translation amount and the VCM value that are obtained by each electronic device; and obtain the first correspondence by averaging the plurality of groups of initial correspondences.

20. The apparatus according to claim 15, wherein based on that the first VCM value is between a second preset VCM value and a first preset VCM value, the second preset VCM value is less than the first preset VCM value, and a distance corresponding to the first preset VCM value is greater than the preset calibration distance, said determining a first translation amount based on a first VCM value of a first image photographed by a wide-angle camera comprises:

using a translation amount corresponding to the first preset VCM value as the first translation amount.

21. The apparatus according to claim 20, wherein based on that the first VCM value is less than the second preset VCM value, the determining a first translation amount based on a first VCM value of a first image photographed by a wide-angle camera comprises:

determining the first translation amount as 0.

22. The apparatus according to claim 15, further comprising:

a fourth determining module, configured to determine a VCM value corresponding to a first preset distance and a VCM value corresponding to a second preset distance based on the calibrated VCM value and a preset VCM current relationship, wherein the first preset distance is less than the second preset distance, and the preset VCM current relationship is a correspondence between a preset distance and a VCM value; and further configure to respectively obtain a translation amount corresponding to the first preset distance and a translation amount corresponding to the second preset distance by using the VCM value corresponding to the first preset distance and the VCM value corresponding to the second preset distance in the preset calibration distance, wherein the determining a first translation amount based on a first VCM value of a first image photographed by a wide-angle camera comprises:

determining the first translation amount based on the first VCM value, the calibrated VCM value, the first calibrated translation amount, the VCM value corresponding to the first preset distance, the VCM value corresponding to the second preset distance, the translation amount corresponding to the first preset distance, and the translation amount corresponding to the second preset distance.

23. The apparatus according to claim 22, wherein the determining the first translation amount based on the first VCM value, the calibrated VCM value, the first calibrated translation amount, the VCM value corresponding to the first preset distance, and the VCM value corresponding to the second preset distance comprises:

determining that the first translation amount is the first calibrated translation amount based on that the first VCM value is greater than or equal to ½ of a sum of the calibrated VCM value and the VCM value corresponding to the first preset distance; or determining that the first translation amount is the translation amount corresponding to the first preset distance based on that the first VCM value is greater than or equal to ½ of a sum of the VCM value corresponding to the first preset distance and the VCM value corresponding to the second preset distance and less than ½ of a sum of the calibrated VCM value and the VCM value corresponding to the first preset distance; or determining that the first translation amount is the translation amount corresponding to the second preset distance based on that the first VCM value is greater than or equal to a second preset VCM value and less than ½ of a sum of the VCM value corresponding to the first preset distance and the VCM value corresponding to the second preset distance, wherein the second preset VCM value is less than a first preset VCM value, and a distance corresponding to the first preset VCM value is greater than the preset calibration distance; or determining the first translation amount as 0 based on that the first VCM value is less than the second preset VCM value.

24. The apparatus according to claim 15, wherein the determining a first translation amount based on a first VCM value of a first image photographed by a wide-angle camera comprises:

determining the first translation amount based on the first VCM value, the calibrated VCM value, the first calibrated translation amount, and a second preset VCM value, wherein the second preset VCM value is less than a first preset VCM value, and a distance corresponding to the first preset VCM value is greater than the preset calibration distance.

25. The apparatus according to claim 24, wherein the determining the first translation amount based on the first VCM value, the calibrated VCM value, the first calibrated translation amount, and a second preset VCM value comprises:

determining that the first translation amount is the first calibrated translation amount based on that the first VCM value is greater than or equal to ½ of a sum of the calibrated VCM value and the second preset VCM value; or determining that the first translation amount is ½ of the first calibrated translation amount based on that the first VCM value is greater than or equal to the second preset VCM value and less than ½ of a sum of the calibrated VCM value and the second preset VCM value; or determining the first translation amount as 0 based on that the first VCM value is less than the second preset VCM value.

26. The apparatus according to claim 14, wherein the determining a second translation amount based on a zoom multiple of the first image and the first translation amount comprises:

determining the second translation amount based on the following formula:

$$S' = \frac{S}{z_0 - 1} * z - \frac{S}{z_0 - 1},$$

where z represents the zoom multiple of the first image, S' represents the second translation amount, $z_0$ represents a preset zoom multiple, and S represents the first translation amount.

* * * * *